(12) United States Patent
Sbongk et al.

(10) Patent No.: US 12,247,660 B2
(45) Date of Patent: Mar. 11, 2025

(54) GROMMET APPARATUS

(71) Applicant: ILLINOIS TOOL WORKS INC., Glenview, IL (US)

(72) Inventors: Albert Sbongk, Niederstetten (DE); Gerit Vollmer, Linden (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 105 days.

(21) Appl. No.: 17/475,734

(22) Filed: Sep. 15, 2021

(65) Prior Publication Data
US 2022/0090707 A1   Mar. 24, 2022

(30) Foreign Application Priority Data

Sep. 23, 2020   (DE) .................. 10 2020 124 840.7
Nov. 17, 2020   (DE) .................. 10 2020 130 279.7
Jul. 21, 2021   (DE) .................. 10 2021 118 919.5

(51) Int. Cl.
| F16J 15/02 | (2006.01) |
| F16L 5/10  | (2006.01) |
| H02G 3/22  | (2006.01) |

(52) U.S. Cl.
CPC ............... *F16J 15/024* (2013.01); *F16L 5/10* (2013.01); *H02G 3/22* (2013.01); *F16J 15/025* (2013.01)

(58) Field of Classification Search
CPC ............... B60R 16/0222; H02G 3/088; H02G 15/013; F16L 5/10; F16J 15/024; F16J 15/025
See application file for complete search history.

(56) References Cited

U.S. PATENT DOCUMENTS

| 1,800,578 | A | * | 4/1931 | Webb | F16J 15/52 |
| | | | | | 74/566 |
| 3,873,135 | A | * | 3/1975 | Kreitzberg | F16L 5/10 |
| | | | | | 333/248 |
| 4,522,378 | A | * | 6/1985 | Nelson | F16F 1/3732 |
| | | | | | 267/141.4 |
| 4,685,173 | A | * | 8/1987 | Pavur | F16L 5/10 |
| | | | | | 16/2.2 |
| 5,739,475 | A | * | 4/1998 | Fujisawa | B60R 16/0222 |
| | | | | | 174/153 G |
| 6,058,562 | A | * | 5/2000 | Satou | B60R 16/0222 |
| | | | | | 174/153 G |
| 6,240,597 | B1 | * | 6/2001 | Mochizuki | H02G 15/013 |
| | | | | | 174/152 G |
| 6,442,794 | B2 | * | 9/2002 | Uchida | B60R 16/0222 |
| | | | | | 174/152 G |
| 6,486,400 | B1 | * | 11/2002 | Smutny | H02G 3/22 |
| | | | | | 174/152 G |
| 6,675,439 | B2 | * | 1/2004 | Hashimoto | B60R 16/0222 |
| | | | | | 174/152 G |

(Continued)

FOREIGN PATENT DOCUMENTS

| DE | 202010010438 U1 | 10/2010 |
| DE | 102018103016 A1 | 8/2019 |

(Continued)

*Primary Examiner* — Nicholas L Foster
(74) *Attorney, Agent, or Firm* — THOMPSON HINE LLP (57) ABSTRACT

A grommet apparatus for cable passage is provided at a component opening. It includes a radially circumferential connecting portion for connecting the grommet apparatus to an edge region of a component opening in an assembly direction and a cable passage portion.

7 Claims, 4 Drawing Sheets

(56) References Cited

U.S. PATENT DOCUMENTS

| | | | | |
|---|---|---|---|---|
| 6,727,432 | B2* | 4/2004 | Sato | B60R 16/0222 |
| | | | | 29/623.2 |
| 6,737,583 | B2* | 5/2004 | Saeki | B60R 16/0222 |
| | | | | 174/152 G |
| 6,995,317 | B1* | 2/2006 | Dzurilla | H02G 3/22 |
| | | | | 174/152 G |
| 7,105,750 | B1* | 9/2006 | Duhr | B60R 16/0222 |
| | | | | 174/650 |
| 8,314,337 | B2* | 11/2012 | Fujita | H02G 3/22 |
| | | | | 174/152 G |
| 8,546,695 | B2* | 10/2013 | Okuhara | H02G 3/083 |
| | | | | 174/152 G |
| 8,608,206 | B2* | 12/2013 | Fedale, Sr. | E04D 13/1407 |
| | | | | 285/43 |
| 8,981,228 | B2* | 3/2015 | Okuhara | B60R 16/0222 |
| | | | | 174/152 G |
| 9,365,171 | B2* | 6/2016 | Shitamichi | H02G 3/22 |
| 9,863,557 | B2* | 1/2018 | Haynes | F16L 5/10 |
| 10,192,657 | B2* | 1/2019 | Ujita | H01B 7/0045 |
| 10,449,914 | B2* | 10/2019 | Katoh | H02G 3/38 |
| 10,787,134 | B2* | 9/2020 | Suenaga | H01B 17/58 |
| 11,279,302 | B2* | 3/2022 | Toyoda | H02G 3/22 |
| 11,320,067 | B2* | 5/2022 | Short | F16L 3/127 |
| 11,473,563 | B2* | 10/2022 | Van Hinsbergh | F16J 15/52 |
| 2002/0004967 | A1* | 1/2002 | Saeki | B60R 16/0222 |
| | | | | 16/2.1 |
| 2003/0098171 | A1* | 5/2003 | Sato | B60R 16/0222 |
| | | | | 174/663 |
| 2004/0069521 | A1* | 4/2004 | Shimola | H02G 3/22 |
| | | | | 174/659 |
| 2006/0163821 | A1* | 7/2006 | Henry | F16L 5/10 |
| | | | | 277/604 |
| 2009/0115140 | A1* | 5/2009 | Henry | F16L 5/10 |
| | | | | 277/612 |
| 2009/0314518 | A1 | 12/2009 | Hasegawa | |
| 2011/0011625 | A1* | 1/2011 | Okuhara | H02G 3/22 |
| | | | | 174/152 G |
| 2011/0073350 | A1* | 3/2011 | Okuhara | B60R 16/0222 |
| | | | | 174/152 G |
| 2011/0073351 | A1* | 3/2011 | Okuhara | B60R 16/0222 |
| | | | | 174/152 G |
| 2011/0079417 | A1* | 4/2011 | Okuhara | B60R 16/0222 |
| | | | | 174/152 G |
| 2011/0198110 | A1* | 8/2011 | Fujita | B60R 16/0222 |
| | | | | 174/153 G |
| 2013/0008693 | A1* | 1/2013 | Okuhara | F16L 5/10 |
| | | | | 174/152 G |
| 2015/0129303 | A1* | 5/2015 | Shitamichi | B60R 16/0222 |
| | | | | 174/72 A |
| 2015/0214706 | A1 | 7/2015 | Feng | |
| 2017/0349123 | A1* | 12/2017 | Katoh | H01B 17/583 |
| 2018/0261360 | A1* | 9/2018 | Ujita | H01B 7/0045 |
| 2019/0249648 | A1* | 8/2019 | Van Hinsbergh | F03D 13/25 |
| 2019/0252821 | A1 | 8/2019 | Kessler | |
| 2019/0351849 | A1* | 11/2019 | Suenaga | B60R 16/0222 |
| 2020/0353881 | A1* | 11/2020 | Toyoda | B60R 16/0222 |
| 2021/0033222 | A1* | 2/2021 | Short | F16L 5/025 |
| 2022/0032864 | A1* | 2/2022 | Kiyota | B60R 16/0222 |
| 2022/0243842 | A1* | 8/2022 | Short | F16L 5/14 |
| 2023/0036999 | A1* | 2/2023 | Van Hinsbergh | H02G 3/22 |

FOREIGN PATENT DOCUMENTS

| | | | | |
|---|---|---|---|---|
| EP | 1693939 | A2 * | 8/2006 | B60R 16/0222 |
| GB | 993811 | A | 6/1965 | |

* cited by examiner

GROMMET APPARATUS

TECHNICAL FIELD

The present invention relates to a grommet apparatus for the passage of lines, in particular for cable passage or also for passing fluid lines through a component opening.

BACKGROUND

One or more cables and, for example, also cable harnesses are generally guided through a plate of a carrier component, for example a body of a motor vehicle, using an EPDM grommet (grommet apparatus).

The main task of these grommets is to seal the respective body portions or housings against environmental factors (dust, moisture, noise), wherein simultaneous passage of one or more cables is permitted without damage to them.

Such grommets are provided to have a central opening for the passage of one or more cables, in particular also cable harnesses. When assembling onto a plate, these must be pressed in a circular annular manner in the edge region in an assembly direction in order to connect them to a body plate. Due to the repeated pressing, relatively high assembly forces are produced in order to achieve the desired sealing effect. Therefore, such EPDM grommets usually have a very high proportion of material in order to ensure sufficient stability during assembly.

In addition, repeated pressing during assembly often results in the need to check a correct assembly position frequently.

In order to improve the assemblability of such grommets, a second, harder component is often used in order to improve the assembly behavior. The harder component is then used together with a softer component for sealing.

Another known option for improving assemblability is to pre-treat the corresponding sealing portions of the grommet with chemicals before they are inserted into a corresponding component opening.

Nevertheless, many grommets do not provide sufficient sealing of a corresponding component opening and are difficult to assemble.

Some grommets collect water in the region of the sealing portion due to the design, which leads to corrosion on the respective component or causes damage in the region of the sealing.

Commonly, cable harnesses are also passed through the plate of an automotive body using EPDM grommets. Sometimes, grommets made of TPE or 2K grommets are also used.

The main tasks of these grommets are to seal the body against environmental influences (dust, moisture, noise) and at the same time to pass cables without causing damage.

Often, passing the cable harness through a grommet also serves to guide the cable harness in a predetermined direction or to reach a predetermined cable output. This has the advantage that, even with limited design space, contact between the cable harnesses and surrounding components is avoided and there is thus protection against damage. The cable passage also allows for tight routing of the cable harness.

A cable passage arrangement is disclosed in DE 10 2018 103 016 A1. This includes an insertion opening, which is configured as a step opening, which has, at its region near a housing interior, a small step with a smaller radial extension and, in its outwardly opening region, a large step with a larger radial extension, with a connecting member having an axial passage opening, which is insertable into the insertion opening from the outside up to an installation position and can be fixed in the installation position, wherein the connecting member, in its installation position, projects through the small step of the step opening into the housing interior with an axial pin piece and projects into the large step of the step opening with an axial holding region, as well as with a cable grommet, through which a cable guided through the passage opening of the connecting member is guided outwardly and encloses a holding region with its one end and, with elastic pre-tension, radially circumferentially abuts on both a radially circumferential lateral surface of the holding region as well as on a radially circumferential inner surface of the large step of the step opening.

SUMMARY

The problem addressed by the present invention is to provide a grommet apparatus for cable passage through a component opening, said apparatus being simple to handle and safe and reliable to operate.

In particular, a problem addressed by the present invention is to provide a grommet apparatus that is inexpensive and easily manufactured.

A further problem addressed by the present invention is to improve the assemblability of such grommet apparatuses.

In addition, a further problem addressed by the present invention is to reliably seal a component opening against moisture and water.

Furthermore, a problem addressed by the present invention is to provide a grommet apparatus that allows a cable output at a predetermined angle or a cable guide at different radii. This means that this problem of the present invention lies in guiding a cable along a radius or along a bend.

One or more of these problems is solved with a grommet apparatus according to the independent claim 1. Advantageous configurations are specified in the respective dependent subclaims.

According to the present invention, and in particular according to a first exemplary embodiment of the present invention, a grommet apparatus for the passage of lines is provided at a component opening. This comprises a cable passage portion and a radially circumferential connecting portion for connecting the grommet apparatus to an edge region of a component opening. The grommet apparatus is characterized in that the connecting portion has an inner and an outer stiffening wall, which are arranged substantially concentrically with respect to one another.

The connecting of the grommet apparatus to a component, for example a body panel, takes place in an assembly direction.

An assembly direction is understood to mean a direction that extends orthogonally to an edge region of a component that limits a passage opening of a component.

The inventors of the present invention have recognized that there is a significant need for improvement in the assemblability of grommets, because they would be best assembled if a worker could press into the center of the component in order to assemble the grommet into a corresponding component opening. However, the cable passage is provided exactly in this region. As a result, the worker cannot press in the center of the grommet. Thus, it is necessary for the grommet to be pressed radially at the edge. For this purpose, the grommets must be designed to be relatively solid. This leads to a high weight and additional, unnecessary material costs. Furthermore, the assembly is very time consuming, on the one hand due to the assembly itself and on the other hand due to the additional time required in order to check the correct assembly position. Furthermore, corresponding grommets are usually formed from EPDM, which is relatively soft and has a sticky surface in order to achieve the desired sealing properties. To this end, a second hard component is sometimes used in order to stiffen the grommets. However, this is made of a different material than the rest of the grommet apparatus, which leads to higher production costs.

The grommet apparatus according to the invention is characterized in that an inner and an outer stiffening wall are provided. Due to the inner and outer stiffening walls, a grommet apparatus is provided with significantly improved stability.

This can be safely and reliably introduced into and connected to a component opening by a user by applying a force acting in the assembly direction on the edge region of the grommet apparatus.

This simplifies assembly and eliminates the need for costly checks of the correct assembly position.

The inner and outer stiffening walls can be connected to one another via a plurality of radially circumferentially arranged struts. The struts are preferably arranged to be equally spaced apart from one another.

Due to the two inner and outer stiffening walls, which are arranged concentrically to one another and preferably parallel to the assembly direction or to an axial direction, the assembly force to be applied is distributed circularly on almost the entire surface of the grommet apparatus. Deformation of the center part of the grommet during assembly is thereby safely and reliably avoided or significantly reduced.

The inner and the outer stiffening walls can be connected to one another by means of radially circumferentially arranged struts, wherein the struts are preferably arranged to be equally spaced apart from one another.

Such a stiffening structure in the form of the inner and the outer stiffening walls, which are connected to one another via the struts, significantly improves the distribution of the force required for assembly on almost the entire surface of the grommet apparatus. Due to the struts, there is no need to provide for high wall thicknesses, which leads to material savings and thus to lower costs.

In addition, due to the stiffening structure of the grommet apparatus according to the invention, a worker can load it more in the center region than is possible with apparatuses known from the prior art.

Furthermore, the grommet apparatus according to the invention can be assembled with much less force.

In addition, the stiffening structure helps to ensure that the region of the grommet located in the assembly direction does not deform so easily compared to the grommet apparatuses known from the prior art, which leads to higher holding forces in a component opening.

The present invention thus relates to a grommet apparatus for the passage of lines, in particular for cable passage or for passing cable harnesses or also for passing fluid lines through a component opening. A fluid line can be, for example, a cooling water line of a motor vehicle.

The grommet apparatus can be formed from a thermoplastic elastomer (TPE), preferably integrally.

With the grommet apparatus formed from a thermoplastic elastomer, according to the invention, it is possible to form the grommet apparatus from a single material, despite improved properties. Grommets with a stiffening wall known from the prior art are usually made of two different materials in a corresponding two-component injection molding process. Also, it is no longer necessary to use EPDM parts for grommet apparatuses.

This makes manufacturing easier and reduces production costs.

The connecting portion can comprise a sealing portion and a fastening portion.

With the sealing portion of the connecting portion, a seal is achieved in the connection region between the grommet apparatus and the component opening.

By means of the fastening portion, the grommet apparatus can be connected to a component opening.

The radially circumferential fastening portion can comprise catching means for rearward engagement of an edge of a component lying in the assembly direction.

The catching means can be configured as catching members and can have a catching edge arranged opposite to the assembly direction, wherein the catching members extend outward from the fastening portion in radial direction, and wherein the catching members are preferably arranged radially circumferentially at the same distance from one another and are preferably integrally formed on the grommet apparatus.

In this way, radially circumferentially identical holding forces are provided for connecting to a component opening of a component, and the grommet apparatus according to the invention can be produced integrally in a simple manner by means of a corresponding injection molding method.

The sealing portion can have a radially circumferential sealing lip that extends substantially in the assembly direction. A reliable seal of the component opening by means of the grommet apparatus is achieved by means of the sealing lip.

A sealing lip that extends substantially in the assembly direction is understood to lie primarily in the assembly direction on a component opening, however, it also naturally has a component that extends outward in radial direction.

The cable passage portion can be approximately funnel-shaped and extend counter to the assembly direction, wherein a cable passage opening is preferably approximately formed at the center of the cable passage portion. The cable passage portion is preferably limited by the inner stiffening wall.

The cable passage portion can have approximately twice the length in the assembly direction or in the axial direction opposite to a base body of the apparatus. The base body is the connecting portion with the sealing portion and the fastening portion as well as the inner and outer stiffening walls along with the corresponding struts.

Due to the length of the cable passage portion, there is still sufficient space available for sealing, with adhesive tape, a cable passed through the cable passage or a plurality of cables passed through the cable passage or a corresponding cable harness against the cable passage opening.

According to a second exemplary embodiment of the present invention, a grommet apparatus for cable passage is provided at a component opening. It comprises an approximately circular radially circumferential connecting portion for connecting the grommet apparatus to an edge region of a component opening, a cable passage portion comprising a bending portion, and a guiding portion having a cable passage opening, wherein the guiding portion and the bending portion extend in a home position substantially in the axial direction, and wherein the bending portion has flexible structures configured such that the bending portion and the guiding portion are hinged in radial direction such that the guiding portion is inclined, in an assembly position, at a predetermined angle relative to the axial direction.

In the manufacture of the grommet apparatus according to the invention, it is not necessary to provide a slider or a slider tool in the molding tool due to the geometry of the grommet apparatus in the home position, because the guiding portion and the bending portion extend in a home position substantially in the axial direction. All structures of the grommet apparatus can be produced without any undercuts in a deformation direction.

Complicated structures and undercuts can in principle be produced in the plastics processing; however, depending on the complexity, such portions cannot be produced or can be produced only with the help of very complex and expensive forming tools.

By contrast, in the case of the grommet apparatus according to the invention, there are no undercuts in the deformation direction, and all structures of the grommet apparatus can simply be injection molded or produced by means of an injection molding process without the use of a slider tool.

Because the guiding portion and the bending portion extend substantially in the axial direction in a home position, the grommet apparatus is easily manufactured by means of a single-component or two-component injection molding process, and yet, in an assembly position, the guiding portion is inclined at a predetermined angle relative to the axial direction.

Due to the fact that the bending section has flexible structures that are configured such that the bending portion and the guiding portion are hinged in radial direction such that the guiding portion is inclined at a predetermined angle with respect to the axial direction in an assembly position, a grommet apparatus having a defined, bent cable output is provided.

The bent cable output is enabled by the flexible structures of the bending portion, which can be pulled out of the grommet apparatus in axial direction, and in particular in radial direction, together with the guiding portion in order to achieve the assembly position. The predetermined angle is automatically created by the predetermined length ratios of the flexible structures of the bending portion and also by the geometry of the guiding portion.

From the prior art, so-called EPDM grommets are provided for such purposes, for example, for passing cable harnesses through body panels.

The inner passage of the grommet apparatus can have a tapered shape in order to facilitate a pull-through of a cable member. This also guides and seals a corresponding cable member. At the same time, there is still the possibility to wrap the cable member with a band, for example a textile band.

A defined cable output of the grommet apparatus, e.g. by 90° opposite to the axial direction in combination with the conical makes an injection molding challenging and, in some cases, impossible, because deformation would have to occur counter to the deformation direction. This problem is solved safely and reliably with the grommet apparatus according to the invention.

The inclination of the guiding portion at a predetermined angle with respect to the axial direction can be maintained in the assembly position such that the guiding portion remains in a hinged position.

The flexible structures in the bending portion can be formed as radially circumferential folds, preferably with two or more folds provided, wherein the folds form hinge segments.

The folds are formed in the manner of a bellows, wherein one fold comprises two legs. The hinge segments can be formed by a leg of a fold or also by two adjacent legs of two folds. This will be explained in detail in the following on the basis of the exemplary embodiment.

Furthermore, a length of the folds in axial direction can increase along a transverse direction that is transverse to the axial direction.

By increasing the length of the folds along the transverse direction or across the cross-section of the grommet apparatus, the folds can be used in order to form the hinge segments such that a cable output via the guiding portion is enabled in an assembly position at a predetermined angle with respect to the axial direction.

The bending portion and the guiding portion can be hinged in radial direction about a folding axis disposed transverse to the axial direction and transverse to the transverse direction such that the guiding portion is inclined at a predetermined angle of about 5° to 165°, and preferably at a predetermined angle of about 30° to 115° relative to the axial direction in an assembly position. The bend can thus be at least about 5° or 10° or 15° or 20° or 30° or 40° or 50° and at most about 170° or 160° or 150° or 140° or 130° or 120° or 110° or 100°, respectively.

The cable output at a predetermined angle or the predetermined angle is determined not only by the length ratios of the folds in the home state, but also by the number of hinge segments.

The predetermined angle at which the guiding portion and its passage opening are inclined relative to the axial direction results from the sum of the individual angles of the hinge segments or the folds of the bending portion and can be realized by varying the corresponding angles and lengths or the parameters within an angle range of about 10° to 165°.

The guiding portion can have a passage opening for passing a cable member, wherein the guiding portion is approximately conical in shape.

Preferably, the guiding portion tapers counter to an assembly direction.

Due to the fact that the guiding portion is formed to be in an approximately conically tapered shape, a cable member that is guided through the passage opening is arranged to be centered.

A cable member can comprise one or more cables, for example a cable harness and/or corresponding plugs for connecting of cables.

In addition, the conical shape facilitates a pull-through of a cable member through the grommet apparatus.

Furthermore, the connecting portion can comprise at least one and preferably two radially circumferential stiffening walls extending in the axial direction circularly.

The grommet apparatus according to the first and the second exemplary embodiments of the invention are connected to one another in such a way that they realize a single general inventive idea. The general inventive idea in the context of the present invention is that the connecting portion has an inner and an outer stiffening wall. The inventions according to the first and the second exemplary embodiments can therefore have a single common subject matter.

However, the grommet apparatus according to the first exemplary embodiment of the invention presents a separate idea of the invention in that the guiding portion extends in a home position substantially in the axial direction, and the grommet apparatus is thus easily manufactured and still allows a cable output at a predetermined angle with respect to the axial direction.

However, this can be advantageously combined with the single common inventive idea.

The grommet apparatus according the second exemplary embodiment of the invention is characterized by the single common inventive idea in which the advantages described above can be achieved by providing the inner and the outer stiffening wall in the connecting portion.

The apparatus according to the second exemplary embodiment can be advantageously combined with the first exemplary embodiment such that, again, an apparatus is provided having two stiffening walls and a guiding portion that extends substantially in the axial direction in a home position and in the assembly position allows a cable output at a predetermined angle.

BRIEF DESCRIPTION OF THE DRAWINGS

The grommet apparatus according to the invention is explained in the following on the basis of two exemplary embodiments as shown in the figures. The figures show.

DETAILED DESCRIPTION

Figure 1:
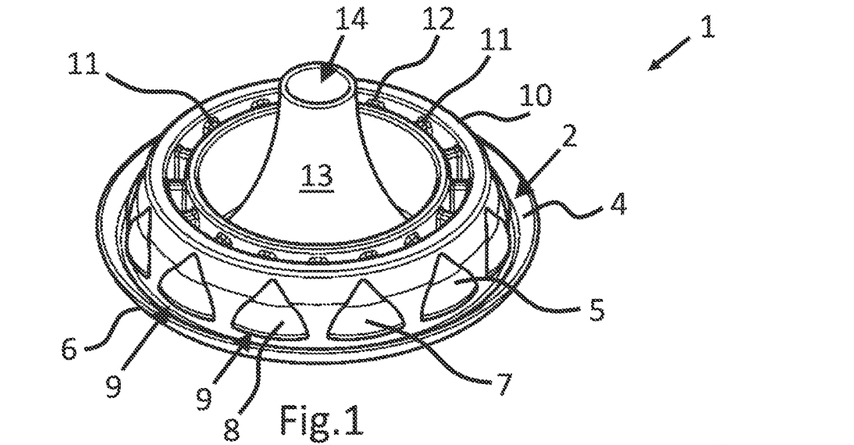
FIG. 1 a perspective view of a grommet apparatus according to the invention according to a second exemplary embodiment, FIG. 2 a side-cut view of the grommet apparatus, FIG. 3 a further perspective view of the grommet apparatus, FIG. 4 a perspective view of a grommet apparatus according to the invention according to a first exemplary embodiment, FIG. 5 a further perspective view of the grommet apparatus according to the invention, FIG. 6 a further perspective view of the grommet apparatus according to the invention, FIG. 7 a side-cut view of the grommet apparatus according to the first exemplary embodiment in a home position, FIG. 8 a side-cut view of the grommet apparatus from FIG. 7 in an assembly position, FIG. 9 a side-cut perspective view of the grommet apparatus according to the first exemplary embodiment in a home position, and FIG. 10 a side-cut perspective view of the grommet apparatus from FIG. 9 in an assembly position.
Figure 2:
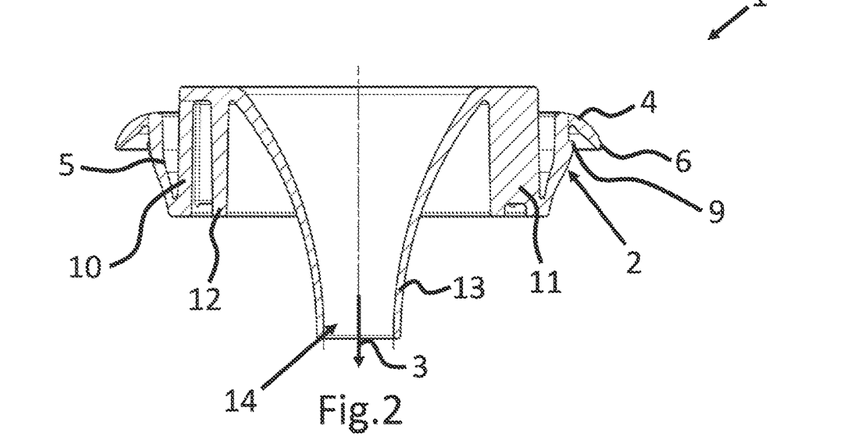
Figure 3:
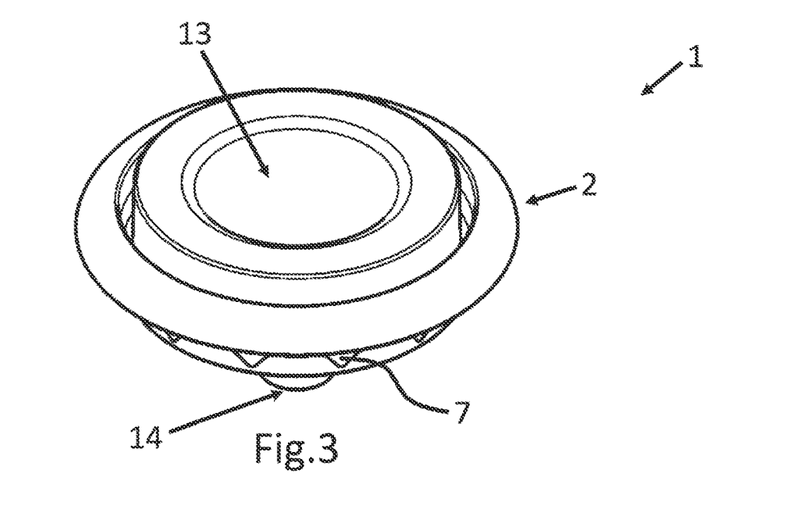

A grommet apparatus 1 according to the invention for the passage of lines through a component is described in more detail in the following on the basis of a first exemplary embodiment (FIGS. 1 to 3).

The grommet apparatus 1 comprises a radially circumferential connecting portion 2 for connecting the grommet apparatus 1 to an edge region of a component opening (not shown).

The grommet apparatus 1 is provided for insertion into the component opening in an assembly direction 3.

The connecting portion 2 has a sealing portion 4 and a fastening portion 5.

The sealing portion 4 has a circular annular sealing lip 6, which extends substantially in the assembly direction 3. In a home state, the sealing lip 6 extends approximately at an angle of 30 to 75 degrees opposite a horizontal. Accordingly, the sealing lip 6 extends both in the assembly direction 3 as well as transversely thereto.

The sealing lip 6 of the sealing portion 4 is connected to the fastening portion 5 by a portion opposite to the assembly direction 3.

The fastening portion 5 is approximately tubular in shape. Catching means 7 are integrally formed on the fastening portion 5. The catching means 7 are provided for rearward engagement with an edge of a component lying in the assembly direction 3. The catching means 7 are configured as catching members 8, wherein the catching members 8 have a catching edge 9 arranged to face opposite to the assembly direction. That is to say, the catching edge 9 faces the assembly direction 3 and extends approximately transversely thereto.

The catching edges 9 are configured in order to rearwardly engage a portion of a component opening facing in the assembly direction 3. The catching members 8 are arranged on the fastening portion 5 in a radially circumferential manner and approximately equally spaced apart from one another.

A region of the fastening portion 5 lying in the assembly direction 3 is connected to an outer stiffening wall 10. The outer stiffening wall 10 is approximately tubular in shape and extends substantially parallel to the assembly direction 3 or in an axial direction 19 of the grommet apparatus 1.

The outer stiffening wall 10 is connected to an inner stiffening wall 12 via struts 11 extending in the assembly direction. The inner stiffening wall 12 is also approximately tubular in shape.

The struts 11, in particular stiffening struts, are provided radially circumferential and equally spaced apart from one another between the outer stiffening wall 10 and the inner stiffening wall 12.

A region of the inner stiffening wall 11 lying opposite to the assembly direction 3 is connected to a line/cable passage portion 13. Accordingly, the inner stiffening wall 12 limits the cable passage portion 13.

In the context of the present invention, the cable passage portion is used in order to receive one or more electrical cables or to receive one or more lines or hoses, in particular lines for liquids.

The cable passage portion 13 extends in the assembly direction 3 and is approximately conical in shape. In the center of the cable passage portion 13, a cable passage opening 14 is provided.

The approximately conical cable passage portion 13 extends over the fastening portion and the inner and outer stiffening walls 12, 10 in the assembly direction 3 such that sufficient space is still available in order to seal a cable that is passed through the cable passage opening 14 or a plurality of cables that are passed through the cable passage opening 14 or a corresponding cable harness with adhesive tape against the cable passage opening.

This means that the cable passage portion has approximately twice the length of a base body 15 of the apparatus in the assembly direction or in the axial direction 19.

The base body 15 is the connecting portion 2 with the sealing portion 4 and the fastening portion 5 as well as the inner and outer stiffening walls 12, 10 with the corresponding struts 11.

Instead of the catching members 8 with corresponding catching edges 9, other suitable connecting members for the rearward engagement of a component opening, for example corresponding catching tabs, or any other type of catching members can also be provided.

In the following, the grommet apparatus 1 according to the invention is described based on a second exemplary embodiment (FIGS. 4 to 10). Unless otherwise described, the grommet apparatus 1 according to the second exemplary embodiment of the invention has the same technical features as the grommet apparatus 1 according to the exemplary embodiment of the invention described above. The same technical features bear the same reference numerals.

Figure 4:
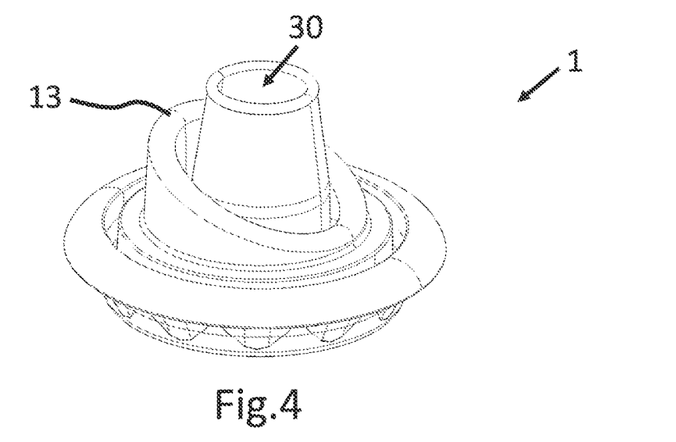
Figure 5:
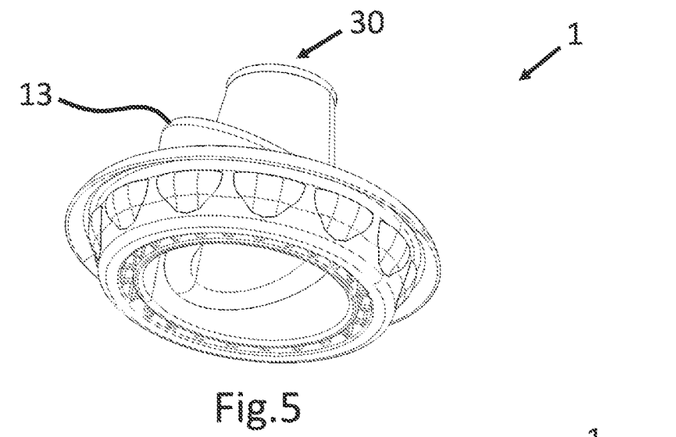
Figure 6:
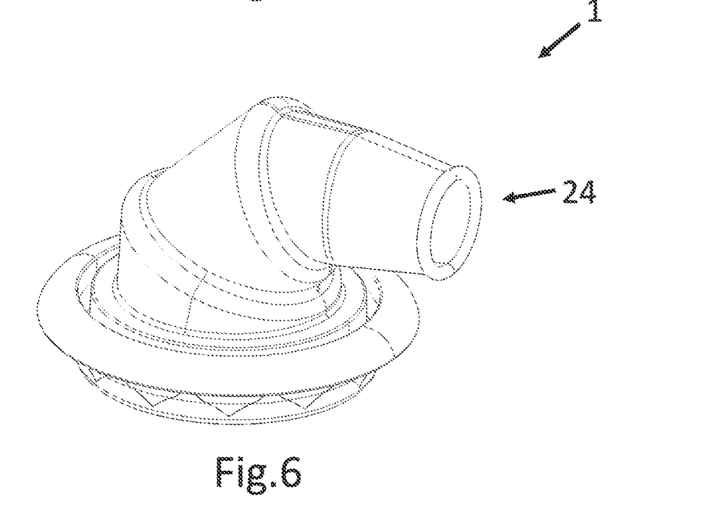

Preferably, the grommet apparatus 1 according to the second exemplary embodiment also comprises an inner stiffening wall 12 and an outer stiffening wall 10. However, it can also be provided that only one stiffening wall is provided and/or the connecting portion 2 forms the stiffening wall.

According to the second embodiment, the cable passage portion 13 comprises a bending portion 16 and a guiding portion 17. The guiding portion 17 is tapered or conical in shape counter to the assembly direction 3.

The guiding portion 17 further has the cable passage opening 14.

The bending portion 16 comprises flexible structures 18. The flexible structures 18 are preferably formed as radially circumferential folds 20 extending in an axial direction 19.

In accordance with the present exemplary embodiment, two such folds 20 are provided. The folds 20 extend in approximately the axial direction 19, wherein each fold 20 has a first and a second leg 21, 22.

Figure 7:
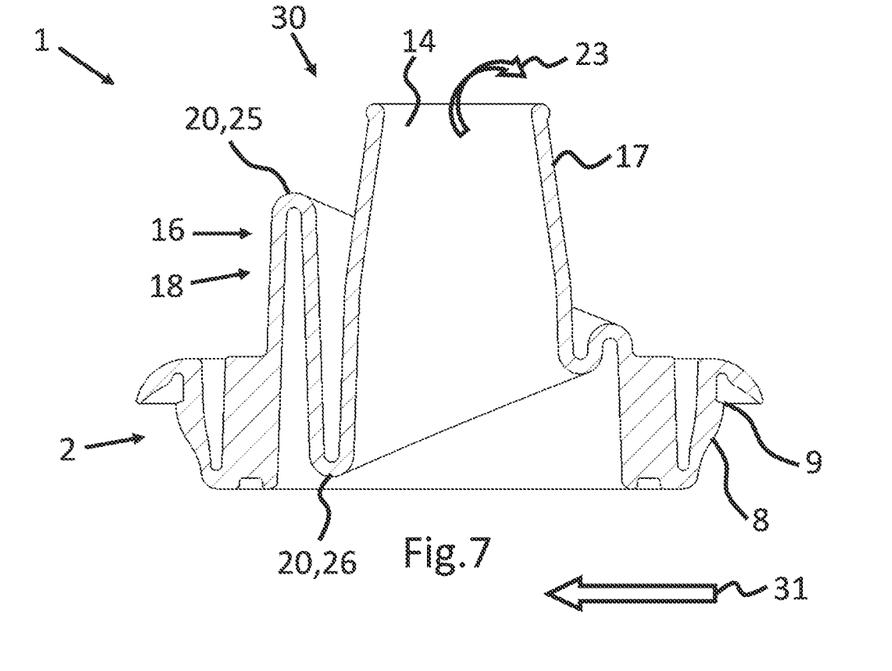
Figure 8:
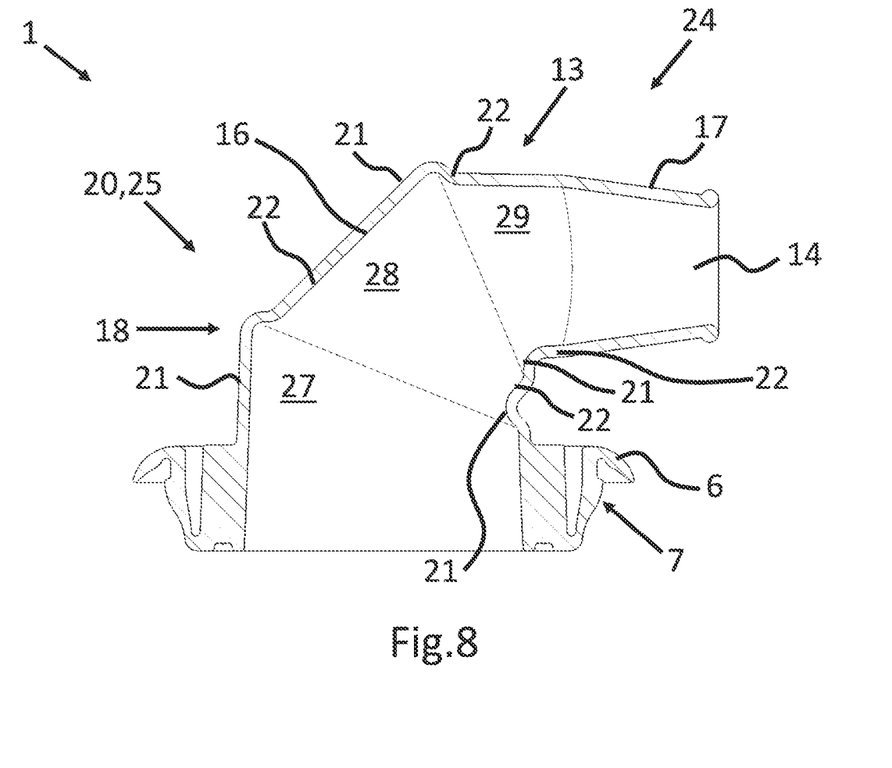

The flexible structures 18 and/or the folds 20 are configured such that the bending portion 16 and the guiding portion 17 are hinged in radial direction 23 such that the guiding portion 17 is inclined in an assembly position 24 at a predetermined angle to the axial direction 19.

Figure 9:
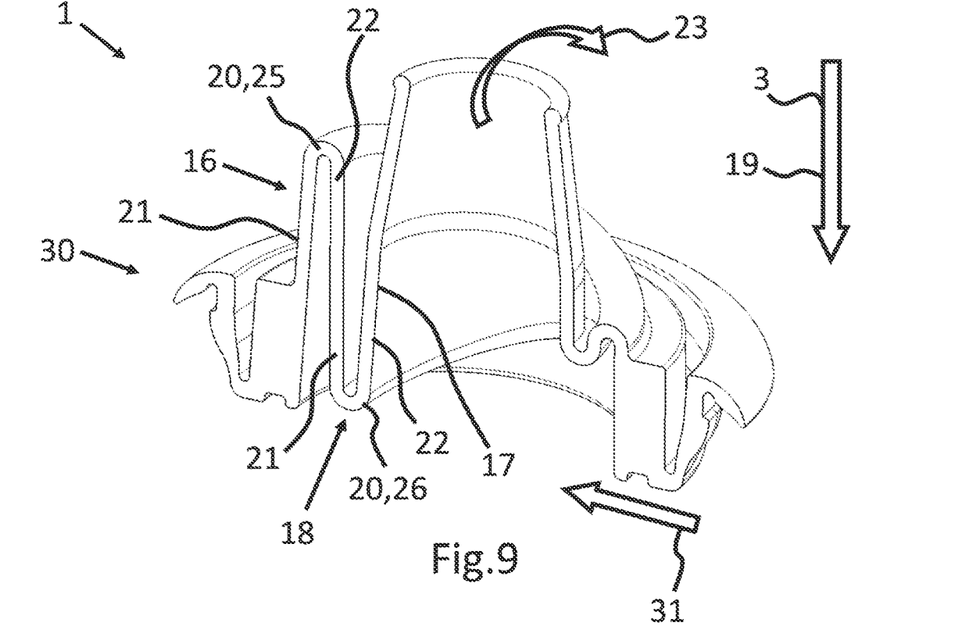

The apparatus 1 according to the invention according to the first exemplary embodiment is characterized in that, among other things, the guiding portion 17 and the bending portion 16 extend substantially in the axial direction 19 in a home position. In this way, no sliders are necessary in the manufacture of the inventive grommet apparatus by means of an injection molding method, because all structures of the grommet apparatus get along without undercuts in the deformation direction.

As explained above, two folds 20 are provided in the grommet apparatus 1 according to the invention. A first leg 21 of a first fold 25 directly adjoins the connecting portion 2. This leg forms a first hinge segment 27.

However, only one fold 20 or three or four or five or more folds 20 can be provided.

A length of the folds 25, 26 in the axial direction 19 increases along a transverse direction 31 running transversely to the axial direction 19.

A second leg 22 of the first fold together with a first leg 21 of the second fold 26 forms a second hinge segment 28.

The second leg 22 of the second fold 26 is connected to the guiding portion 17 and forms a third hinge segment 29.

When transferring the grommet apparatus 1 according to the invention from the home position 30 into the assembly position 24, the first, second, and third hinge segments 27, 28, 29 can be hinged in radial direction 23 about a folding axis 32 arranged transversely to the axial direction 19 and transversely to the transverse direction 31.

Figure 10:
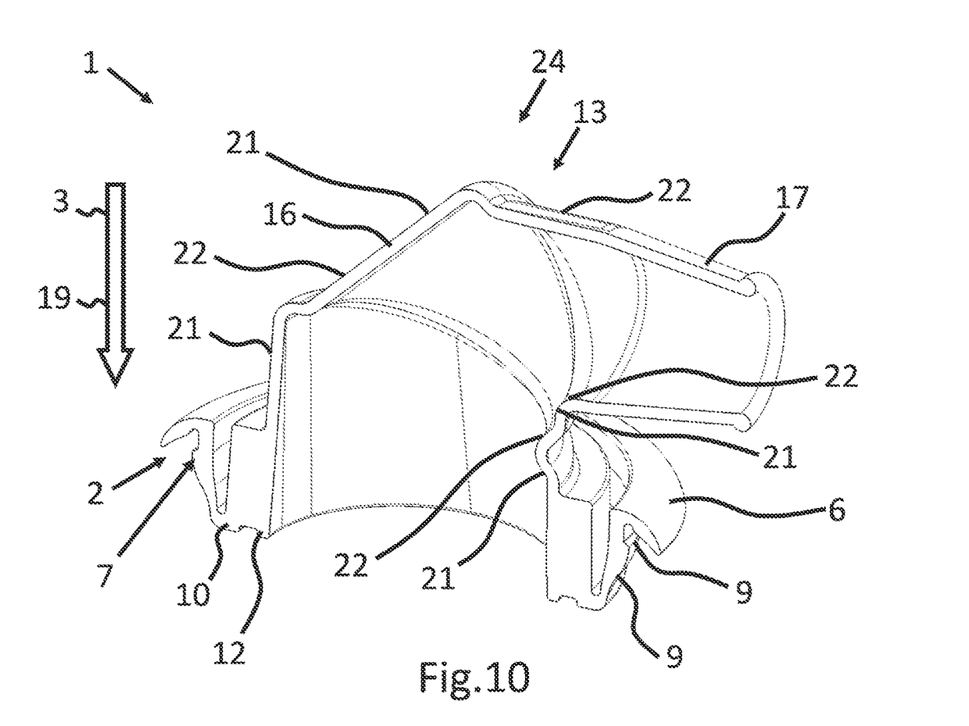

In this way, the guiding portion is inclined in the assembly position 24 at a predetermined angle of about 10° to 165°, or about 25° to 145°, or about 45° to 110°, or about 75° to 90°, relative to the axial direction.

Because, in the home position 30, the guiding portion 17 and the bending portion 16 extend substantially in the axial direction 19, the present invention can be produced easily and cost-effectively without a slider by means of an injection molding method.

In addition, nearly any cable outputs can be realized at a predetermined angle relative to the axial direction within a range of 10° to 165°.

Naturally, in the context of the present invention, three or four or more folds can also be provided in addition to the first and the second folds 25, 26. Accordingly, two, three, four, five or more hinge segments can also be provided.

In principle, a predefined cable output with only one fold can also be implemented; then, however, this only allows a smaller angle with respect to the axial direction.

According to a method of manufacture according to the invention, the grommet apparatus 1 is made of a thermoplastic elastomer (TPE), preferably integrally, by means of a single-component injection molding process.

LIST OF REFERENCE NUMERALS

1. Grommet apparatus
2. Connecting portion
3. Assembly direction
4. Sealing portion
5. Fastening portion
6. Sealing lip
7. Catching means
8. Catching members
9. Catching edge
10. Outer stiffening wall
11. Strut
12. Inner stiffening wall
13. Cable passage portion
14. Cable passage opening
15. Base body
16 Bending portion
17 Guiding portion
18 Flexible structures
19 Axial direction
20 Fold
21 Leg
22 Leg
23 Radial direction
24 Mounting position
25 First fold
26 Second fold
27 First hinge segment
28 Second hinge segment
29 Third hinge segment
30 Home position
31 Transverse direction
32 Hinge axis

The invention claimed is:

1. A grommet apparatus for the passage of lines through a component opening, comprising:
   a cable passage portion, and
   a radially circumferential connecting portion for connecting the grommet apparatus to an edge region of the component opening in an assembly direction,
   wherein:
     the connecting portion has an inner and an outer stiffening wall, which are arranged substantially concentrically with respect to one another, the inner stiffening wall having a first and a second end, the first end located furthest in a direction counter to the assembly direction;
     the cable passage portion extends from the connecting portion and is configured with a funnel-shape, wherein the funnel-shape begins at the first end of the inner stiffening wall and extends through the connecting portion in the assembly direction and then beyond the connecting portion such that a size of a cable passage opening through the cable passage portion decreases in a region between the first end of the inner stiffening wall and the second end of the inner stiffening wall when moving from the first end of the inner stiffening wall through the connecting portion in the assembly direction toward the second end of the inner stiffening wall, and a distal end of the funnel-shape is spaced away from the second end of the inner stiffening wall of the connecting portion in the assembly direction;

wherein the inner and outer stiffening walls are connected to one another by radially circumferentially arranged struts, wherein the struts are arranged to be equally spaced apart from one another.

2. The grommet apparatus according to claim 1,
wherein the inner and outer stiffening walls extend approximately parallel to the assembly direction.

3. The grommet apparatus according to claim 1,
wherein the connecting portion comprises a fastening portion, wherein the fastening portion comprises radially circumferentially arranged catching members for rearward engagement with an edge of a component lying in the assembly direction.

4. The grommet apparatus according to claim 3,
wherein the catching members have a catching edge facing opposite to the assembly direction, wherein the catching members extend outwardly from the fastening portion in a radial direction, and wherein the catching members are arranged radially circumferentially and uniformly spaced apart from one another on the catching portion and are integrally formed on the grommet apparatus.

5. The grommet apparatus according to claim 1,
wherein the connecting portion comprises a sealing portion, wherein the sealing portion has a radially circumferential sealing lip extending substantially in the assembly direction.

6. The grommet apparatus according to claim 1
wherein the cable passage opening is formed at approximately the center of the cable passage portion, and wherein the cable passage portion is limited by the inner stiffening wall.

7. The grommet apparatus according to claim 1,
wherein the grommet apparatus is manufactured by a single-component injection molding process.

* * * * *